(12) United States Patent
Izawa

(10) Patent No.: US 10,364,844 B2
(45) Date of Patent: Jul. 30, 2019

(54) SLIDING MEMBER AND MANUFACTURING METHOD THEREFOR

(71) Applicant: NISSAN MOTOR CO., LTD., Yokohama-shi, Kanagawa (JP)

(72) Inventor: Yoshinori Izawa, Kanagawa (JP)

(73) Assignee: NISSAN MOTOR CO., LTD., Yokohama-Shi (JP)

( * ) Notice: Subject to any disclaimer, the term of this patent is extended or adjusted under 35 U.S.C. 154(b) by 0 days.

(21) Appl. No.: 15/749,599

(22) PCT Filed: Jul. 21, 2016

(86) PCT No.: PCT/JP2016/071431
§ 371 (c)(1),
(2) Date: Feb. 1, 2018

(87) PCT Pub. No.: WO2017/022505
PCT Pub. Date: Feb. 9, 2017

(65) Prior Publication Data
US 2018/0223902 A1 Aug. 9, 2018

(30) Foreign Application Priority Data
Aug. 6, 2015 (JP) .................................. 2015-156149

(51) Int. Cl.
*C23C 24/04* (2006.01)
*C23C 28/00* (2006.01)
(Continued)

(52) U.S. Cl.
CPC .............. *F16C 33/128* (2013.01); *C22C 9/00* (2013.01); *C22C 9/02* (2013.01); *C22C 9/06* (2013.01);
(Continued)

(58) Field of Classification Search
CPC ...... C23C 24/04; C23C 28/021; C23C 28/028; C23C 28/345; C23C 30/00; F01L 3/02; F01L 3/04
(Continued)

(56) References Cited

U.S. PATENT DOCUMENTS

| 9,074,629 B2 | 7/2015 | Yamauchi et al. |
| 2005/0069724 A1 | 3/2005 | Obara |

(Continued)

FOREIGN PATENT DOCUMENTS

| EP | 0 505 172 A1 | 9/1992 |
| JP | H01-111831 A | 4/1989 |

(Continued)

OTHER PUBLICATIONS

"Chapter 11. Thermal Processing of Metal Alloys". <<https://web.archive.org/web/20010506080426/http://www.virginia.edu/bohr/mse209/chapter11.htm>>(Year: 2001).*
(Continued)

*Primary Examiner* — Alexander M Weddle
(74) *Attorney, Agent, or Firm* — Foley & Lardner LLP

(57) ABSTRACT

The sliding member includes a base and a coating layer formed on the base, in which the coating layer includes a particle aggregate containing first particles of a precipitation-hardening copper alloy.

The method for manufacturing the sliding member includes the step of spraying a first powder of the precipitation-hardening copper alloy or a mixed powder containing the first powder and a second powder harder than the first powder onto the base in an unmelted state, so as to form the coating layer on the base.

9 Claims, 12 Drawing Sheets

(51) Int. Cl.
*F01L 3/04* (2006.01)
*F16C 33/12* (2006.01)
*F01L 3/02* (2006.01)
*C22C 9/00* (2006.01)
*C22C 9/02* (2006.01)
*C22C 9/06* (2006.01)
*C23C 30/00* (2006.01)
*C23C 28/02* (2006.01)
*C23C 4/067* (2016.01)

(52) U.S. Cl.
CPC ............. *C23C 4/067* (2016.01); *C23C 24/04* (2013.01); *C23C 28/021* (2013.01); *C23C 28/027* (2013.01); *C23C 28/028* (2013.01); *C23C 28/345* (2013.01); *C23C 30/00* (2013.01); *F01L 3/02* (2013.01); *F01L 3/04* (2013.01); *F16C 33/12* (2013.01)

(58) Field of Classification Search
USPC ........................................................ 427/180
See application file for complete search history.

(56) References Cited

U.S. PATENT DOCUMENTS

2006/0093736 A1* 5/2006 Raybould ............... C23C 24/04
427/180
2007/0254180 A1* 11/2007 Ababneh ............... B32B 15/015
428/677
2014/0141282 A1 5/2014 Yamauchi et al.

FOREIGN PATENT DOCUMENTS

| JP | H04-110430 A | | 4/1992 |
| JP | H06-066117 A | | 3/1994 |
| JP | H0666117 A | * | 3/1994 |
| JP | 11-256303 A | | 9/1999 |
| JP | 2008-519157 | | 6/2008 |
| JP | 2008-255490 A | | 10/2008 |
| JP | 4369757 B2 | | 9/2009 |
| JP | 2011-132565 A | | 7/2011 |
| JP | 2013-91832 A | | 5/2013 |
| JP | 5202024 B2 | | 6/2013 |
| JP | 2014-098467 A | | 5/2014 |
| KR | 10-0802329 | | 2/2008 |
| WO | WO-2006/109956 A1 | | 10/2006 |

OTHER PUBLICATIONS

Coddet et al., "Effect of cold work, second phase precipitation and heat treatments on the mechanical properties of copper-silver alloys manufactured by cold spray," Materials Science & Engineering, (2015) vol. 637, pp. 40-47.

* cited by examiner

SLIDING MEMBER AND MANUFACTURING METHOD THEREFOR

TECHNICAL FIELD

The present invention relates to a sliding member and a manufacturing method therefor. In more detail, the present invention relates to a sliding member with high abrasion resistance at high temperature and a manufacturing method therefor. The sliding member is, for example, suitably applied to sliding portions of internal combustion engines that are used in a high temperature environment. Specifically, the sliding member is suitably applied to seating portions for engine valves of valve seats and cylinder heads, valve faces of engine valves, sliding portions against valve guides of engine valves, and bearing metals of bearing mechanisms.

BACKGROUND ART

Patent Document 1 discloses a forming method for a hard coating, which enables forming a hard coating on the surface of a base by cold state strain-induced transformation. The hard coating forming method is to spray solid metal powder onto the surface of the base with compressed gas as a medium so as to form the hard metal coating. In the forming method, the metal powder is made of a metal material that can cause processing-induced transformation, which is slammed into the base at such a high speed that causes processing-induced transformation so that it is plastically deformed into a fiat shape and deposited to layers on the surface of the base while it also causes processing-induced transformation of the previously deposited metal powder. In this way, the forming method is characterized in that the metal coating to be formed on the surface of the base is harder than the metal powder that has not been slammed into the base yet.

CITATION LIST

Patent Literature

Patent Document I: JP 5202024B

SUMMARY OF INVENTION

Technical Problem

However, a problem with the hard coating in Patent Document 1 is the insufficient abrasion resistance at high temperature.

The present invention has been made in view of the above-described problem is with the prior art. It is an object of the present invention to provide a sliding member with high abrasion resistance at high temperature, a method for manufacturing the sliding member, and a sliding member of an internal combustion engine with sliding members.

Solution to Problem

The present inventors have conducted an intensive study in order to achieve the above-described object. As a result, the present inventors found that the above-described object can be achieved by forming a coating layer of a particle aggregate containing first particles of a precipitation-hardening copper alloy on a base. The present invention has been thus completed.

That is, the sliding member of the present invention includes a base and a coating layer formed on the base, in which the coating layer includes a particle aggregate containing first particles of a precipitation-hardening copper alloy. The sliding member further includes an intermediate layer that is formed in at least a part of the interface between the base and the coating layer and comprises at least one of a diffusion layer and an intermetallic compound layer; or the precipitation-hardening copper alloy contains nickel and silicon as additive elements, and the particle aggregate includes at least one precipitation phase of nickel silicate inside and/or in the surface of at least a part of the first particles.

The sliding member of the internal combustion engine of the present invention includes the sliding member of the present invention in a sliding portion of the internal combustion engine.

The method for manufacturing a sliding member of the present invention is to manufacture a sliding member that includes a base, a coating layer formed on the base and an intermediate layer that is formed in at least a part of the interface between the base and the coating layer and comprises at least one of a diffusion layer and an intermetallic compound layer, in which the coating layer includes a particle aggregate containing first particles of a precipitation-hardening copper alloy or a particle aggregate containing the first particles and second particles harder than the first particles. The method for manufacturing the sliding member includes the step of spraying a first powder of the precipitation-hardening copper alloy or a mixed powder containing the first powder and a second powder harder than the first powder onto the base in an unmelted state so as to form the coating layer on the base. Further, in spraying the first powder or the mixed powder onto the base in the method for manufacturing the sliding member, the first powder or the mixed powder is sprayed onto the base at such a speed that makes the first powder be sprayed onto the base to form a plastically deformed portion in at least one of the base and the coating layer.

Advantageous Effects of Invention

With the present invention, it is possible to provide a sliding member with high abrasion resistance at high temperature, a method for manufacturing the sliding member and the sliding member of an internal combustion engine with sliding members.

DESCRIPTION OF EMBODIMENTS

Figure 1:
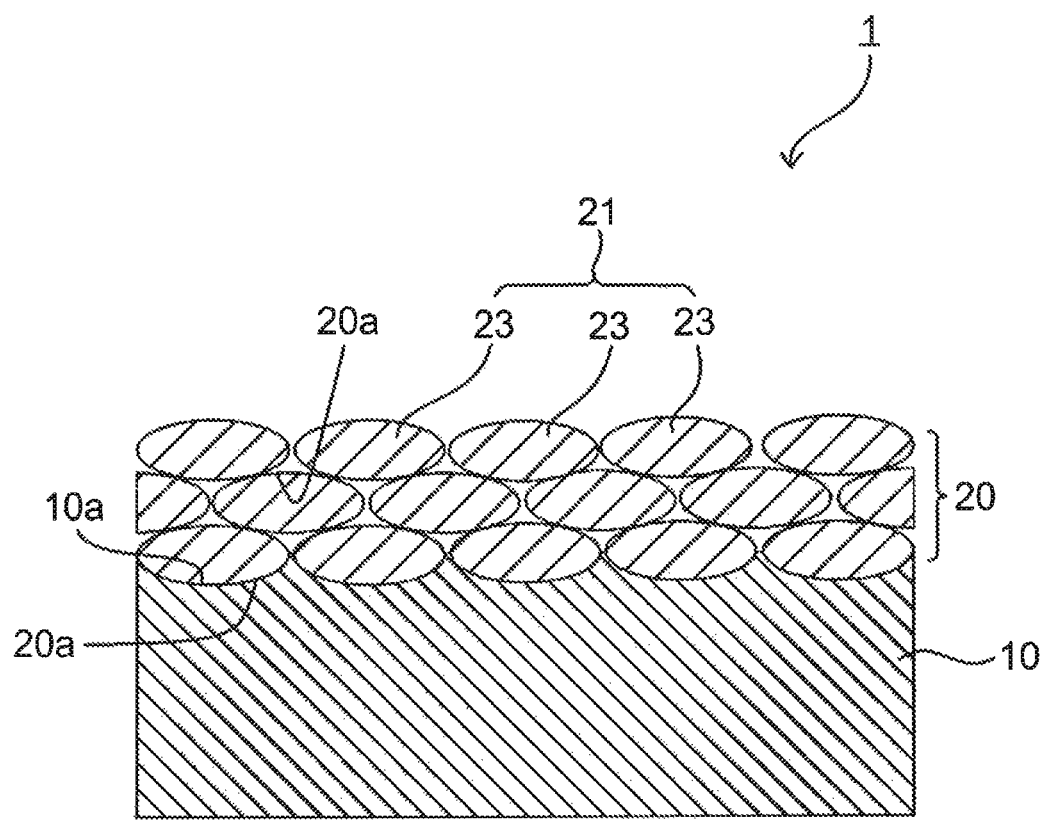
FIG. 1 is a schematic cross-sectional view of a sliding member according to a first embodiment of the present invention.

Hereinafter, a sliding member, a sliding member of an internal combustion engine, a cylinder head, a valve seat, an engine valve, a bearing mechanism of an internal combustion engine, a method for manufacturing a sliding member according to embodiments of the present invention will be described in detail.

First Embodiment

First, a sliding member according to a first embodiment of the present invention will be described in detail referring to the drawings. The dimension of the drawings referred to in the following embodiments is exaggerated for descriptive reasons and may be different from the actual dimension.

FIG. 1 is a schematic cross-sectional view of the sliding member according to the first embodiment of the present invention. As illustrated in FIG. 1, the sliding member 1 of the embodiment includes a base 10 and a coating layer 20 that is formed on the base 10. The coating layer 20 includes a particle aggregate 21 that contains first particles 23 of a precipitation-hardening copper alloy. In the embodiment, the base 10 includes a plastically deformed portion 10a, and the coating layer 20 includes a plastically deformed portion 20a. As used herein, a precipitation-hardening copper alloy means not only a copper alloy that has already been precipitation-hardened but also a copper alloy that has not been precipitation-hardened yet. With regard to the first particles of a precipitation-hardening copper alloy, it is preferred that all of the first particles are made of the copper alloy that has already been precipitation-hardened. However, the first particles are not limited thereto. For example, of the first particles of a precipitation-hardening copper alloy, a part of the first particles may be made of the copper alloy that has already precipitation-hardened, and the reminder of the first particles are made of the copper alloy that has not been precipitation-hardened yet. For another example, of the first particles of a precipitation-hardening copper alloy, all the first particles may be made of the copper alloy that has not been precipitation-hardened yet. A precipitation-hardening copper alloy is also referred to as a particle to dispersion-strengthened copper alloy.

As described above, since the sliding member of the embodiment includes the base and the coating layer formed on the base, in which the coating layer includes the particle aggregate containing the first particles of a precipitation-hardening copper alloy, the sliding member has high abrasion resistance at high temperature. Further, it is also advantageous that the first particles of a precipitation-hardening copper alloy can secure the high heat conduction property. In the present invention, it is not always necessary for at least one of the base and the coating layer to include a plastically deformed portion. However, when at least one of the base and the coating layer includes a plastically deformed portion, the sliding member can have even higher abrasion resistance at high temperature.

It is currently assumed that the above-described advantageous effects are obtained based on at least one of the following grounds.

For example, when the base has an oxide coating on the surface that inhibits adhesion between the base and the coating layer, it is assumed that spraying the first powder of a precipitation-hardening copper alloy onto the base and resultant collision of the first powder with the base removes the oxide coating to expose and form a new interface of the base that exhibits good adhesion with the coating layer, which is described in detail later.

For another example, when the first powder collides with the base and the first particles attached on the base, it is assumed that the kinetic energy of the first powder is partly converted to thermal energy, which promotes fusion and atomic diffusion between the base and the first powder and between the first powder and the first particles.

For still another example, when the first powder collides with the base, it is assumed that the first powder bites into the base. This anchor effect, in other words the plastically deformed portion of the base composed of flat recesses, improves the adhesion between the base and the coating layer.

For still another example, when the first powder collides with the base and the first particles attached on the base, it is assumed that the first powder and the first particles are deformed into a flat shape. This deformation, in other words a plastically deformed portion of the coating layer composed of the deposited flat first particles, reduces the gaps between the first particles to improve the adhesion between the first particles in the particle aggregate.

For still another example, when the first powder collides with the base and the first particles attached on the base, it is assumed that heat is generated during the plastic deformation that forms the flat recesses in the base and that forms the first powder and the first particles into a flat shape, in other words during the formation of the plastically deformed portions of the base and the coating layer. This heat promotes fusion and atomic diffusion between the base and the first powder and between the first powder and the first particles.

However, even when the above-described advantageous effects are obtained based on the other grounds, it should be understood well that the present invention encompasses such sliding members and the like.

Hereinafter, the components will be individually described in more detail.

The base 10 is not particularly limited but is preferably made of a metal that is applicable for the method for manufacturing the sliding member, i.e. the method for forming the coating layer, which will be described in detail later. It should be understood well that the base 10 is configured to he usable in a high-temperature environment in which the sliding member is used.

Examples of metals that are preferably used include alloys of aluminum, iron, titanium, copper and the like known in the art.

Examples of aluminum alloys that are preferably used include AC2A, AC8A, ADC12 and the like according to the Japanese Industrial Standard, and the like. Examples of iron alloys that are preferably used include SUS304 according to the Japanese Industrial Standard, iron-based sintered alloys and the like. Examples of copper alloys that are preferably used include beryllium copper, copper-based sintered alloys and the like.

The coating layer 20 is not particularly limited and may be any layer of a particle aggregate that contains the first particles of a precipitation-hardening copper alloy.

For example, the thickness of the coating layer is not particularly limited and may be suitably selected according to the temperature and the sliding environment of a portion to which the coating layer is applied. For example, the thickness ranges preferably from 0.05 mm to 5.0 mm, more preferably from 0.1 mm to 2.0 mm. When the thickness of the coating layer is less than 0.05 mm, the rigidity of the coating layer itself is insufficient. This may result in a plastic deformation particularly when the base strength is low. When the thickness of the coating layer is greater than 10 mm, the coating may peel off depending on the relationship between the residual stress produced in film formation and the interfacial adhesion strength.

For example, when the porosity of the coating layer is high, the strength may he insufficient and the abrasion resistance at high temperature may be decreased accordingly. In this respect, it is preferred that the porosity of the coating layer is as low as possible. Further, to achieve the sliding member having better heat conduction property, it is preferred that the porosity of the coating layer in a cross section is equal to is or less than 3 area %, particularly 0 area %. Since it is currently possible to reduce the porosity to 0,1 area %, the porosity ranges preferably from 0.1 area % to 3 area % in terms of the abrasion resistance at high temperature, the heat conduction property and the productivity. However, it should be understood well that the porosity is not limited to these ranges at all and may be out of these ranges as long as the advantageous effects of the present invention can he obtained. The porosity of the coating layer in a cross section can be calculated by observation of a scanning electron microscopic (SEM) image or the like of a cross section of the coating layer and image processing of the scanning electron microscopic (SEM) image such as binarization.

The precipitation-hardening copper alloy is not particularly limited, but examples that are preferably used include precipitation-hardening copper alloys that contain nickel and silicon, in other words so-called Corson alloys. However, the precipitation-hardening copper alloy is not limited thereto. Other examples that can also be used include chromium-containing precipitation-hardening copper alloys, in other words so-called chromium copper, and zirconium-containing precipitation-hardening copper alloys, in other words so-called zirconium copper. Further, still other examples that can also be used include precipitation-hardening copper alloys that contain nickel, silicon and chromium, precipitation-hardening copper alloys that contain nickel, silicon and zirconium, precipitation-hardening alloys that contain nickel, silicon, chromium and zirconium, precipitation-hardening copper alloys that contain chromium and zirconium, and the like.

For example, in a precipitation-hardening copper alloy that contains nickel and silicon, it is preferred that the nickel content ranges from 1 mass % to 21 mass % and the silicon content ranges from 0.2 mass % to 8 mass % since even better heat conduction property can be achieved. In a chromium-containing precipitation-hardening copper alloy, it is preferred that the chromium content ranges from 0.02 mass % to 1 mass % since even better heat conduction property can be achieved. In a precipitation-hardening copper alloy that contains nickel and silicon, it is preferred that the mass ratio of the nickel content and the silicon content (Ni:Si) ranges from 3.5:1 to 4.5:1 in terms of precipitation of nickel silicate ($Ni_2Si$). However, it should be understood well that the composition is not limited to these ranges and may be out of these ranges as long as the advantageous effects of the present invention can be obtained. Further, it should be understood well that other elements can be added to the above-described precipitation-hardening copper alloys.

Second Embodiment

Next, a sliding member according to a second embodiment of the present invention will be described in detail referring to the drawings. The same reference sings are denoted to the same components as those in the above-described embodiment, and the description thereof is omitted.

Figure 2:
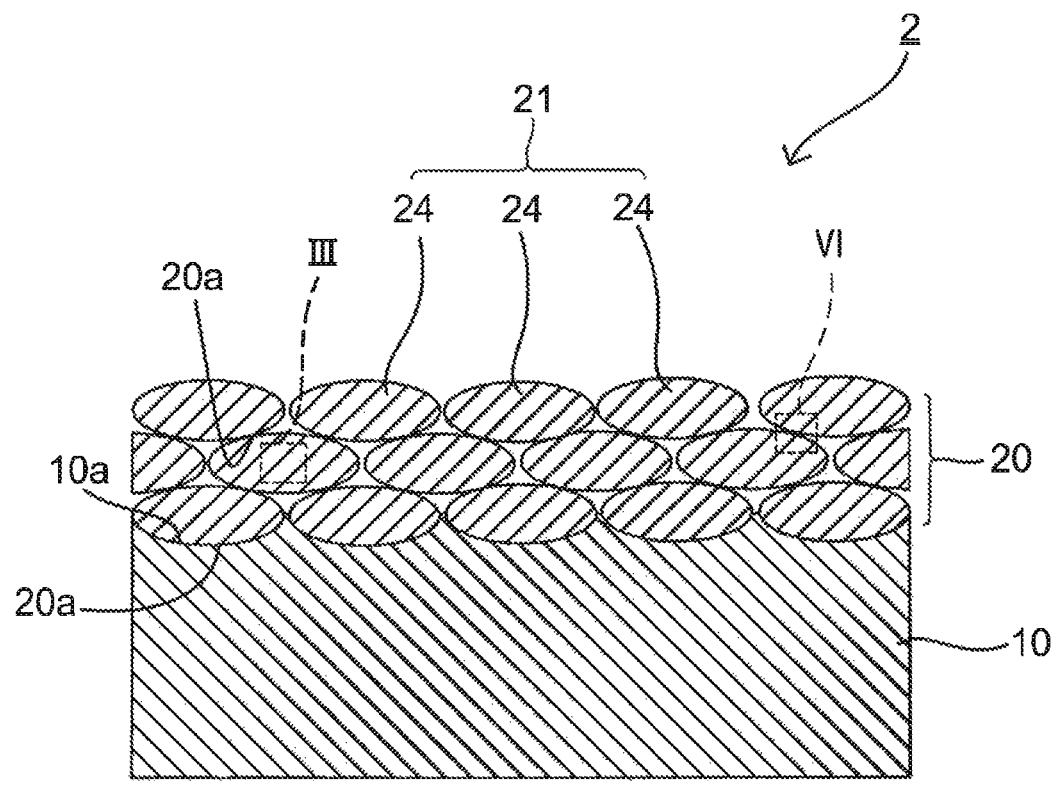
FIG. 2 is a schematic cross-sectional view of a sliding member according to a second embodiment of the present invention.
Figure 3:
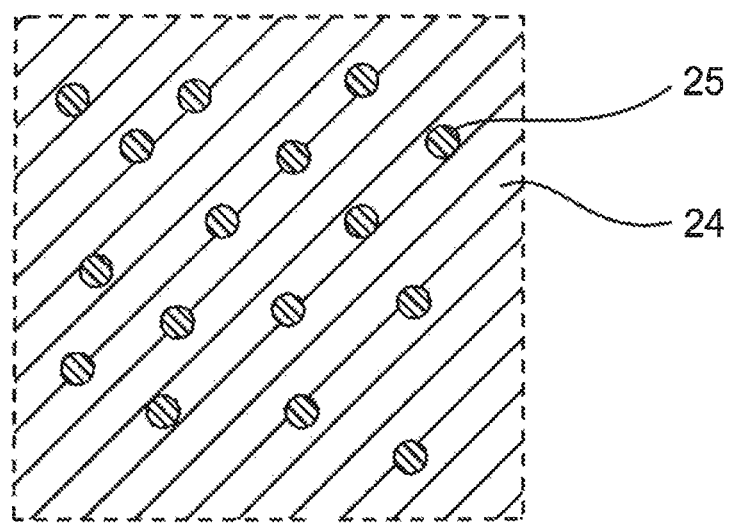
FIG. 3 is an enlargement of the part surrounded by the line III of the sliding member in FIG. 2.
Figure 4:
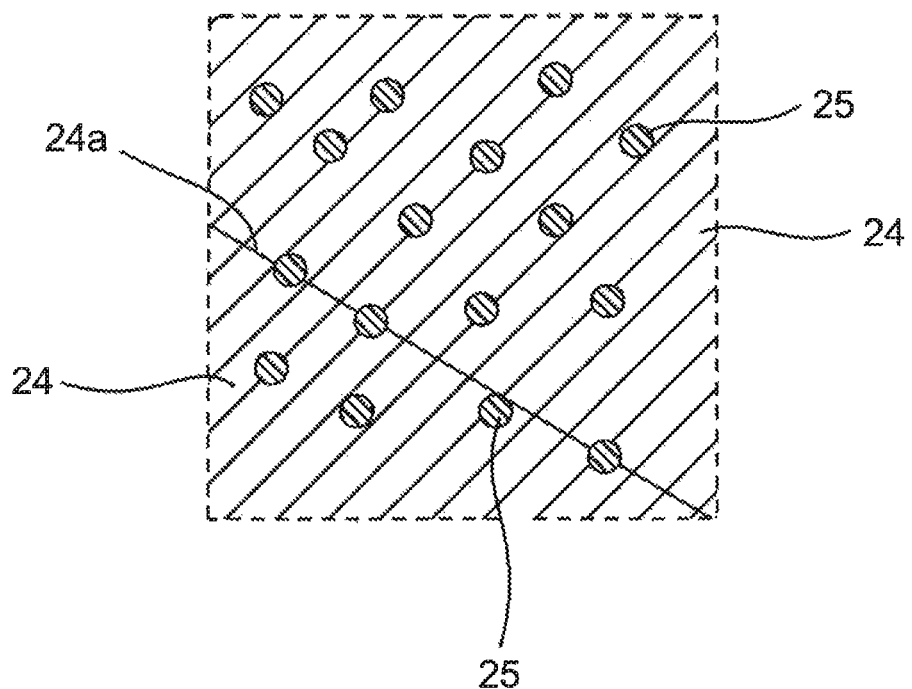
FIG. 4 is an enlargement of the part surrounded by the line IV of the sliding member in to FIG. 2.

FIG. 2 is a schematic cross-sectional view of the sliding member according to the second embodiment of the present invention. FIG. 3 is an enlargement of the part surrounded by the line ill of the sliding member in FIG. 2. FIG. 4 is an enlargement of the part surrounded by the line IV of the sliding member in FIG. 2. As illustrated in FIG. 2 to FIG. 4, the sliding member 2 of this embodiment is different from the sliding member of the first embodiment in that a particle aggregate 21 includes at least one precipitation phase 25 inside or in the surface 24a of at least a part of first particles 24. FIG. 2 to FIG. 4 illustrate an example in which the precipitation phase 25 is included inside and/or in the surface 24a of the first particles. The precipitation-hardening copper alloy of the first particles 24 contains nickel and silicon as additive elements. In this case, the precipitation phase is typically made of nickel silicate ($Ni_2Si$). Although not shown in the figures, it should be understood well that the present invention encompasses the configuration in which the precipitation phase is included inside and/or in the surface of a part of the first particles.

As described above, the sliding member of the embodiment includes the base and the coating layer formed on the base, in which the coating layer includes the particle aggregate containing the first particles of a precipitation-hardening copper alloy, and the particle aggregate includes at least one precipitation phase inside and/or in the surface of at least a part of the first particles. With this configuration, the sliding member exhibits even higher abrasion resistance at high temperature. Further, it is also advantageous that the first particles of a precipitation-hardening copper alloy can secure the high heat conduction property. In the present invention, it is not always necessary that at least one of the base and the coating layer includes a plastically deformed portion. However, even higher abrasion resistance at high temperature can be achieved when at least one of the base and the coating layer of the sliding member includes a plastically deformed portion.

It is currently assumed that the above-described advantageous effects are obtained based on the following grounds.

For example, when the first powder of a precipitation-hardening copper alloy is sprayed onto the base to collide with the base and the first particles attached on the base, the kinetic energy of the first powder is partly converted to thermal energy. It is assumed that this promotes precipitation hardening of the precipitation-hardening copper alloy of at least one of the first powder and the first particles, which is described in detail later.

However, even when the above-described advantageous effects are obtained based on the other grounds, it should be understood well that the present invention encompasses such sliding members and the like.

Third Embodiment

Next, a sliding member according to a third embodiment of the present invention will be described referring to the drawings. The same reference signs are denoted to the same components as those in the above-described embodiments, and the description thereof is omitted.

Figure 5:
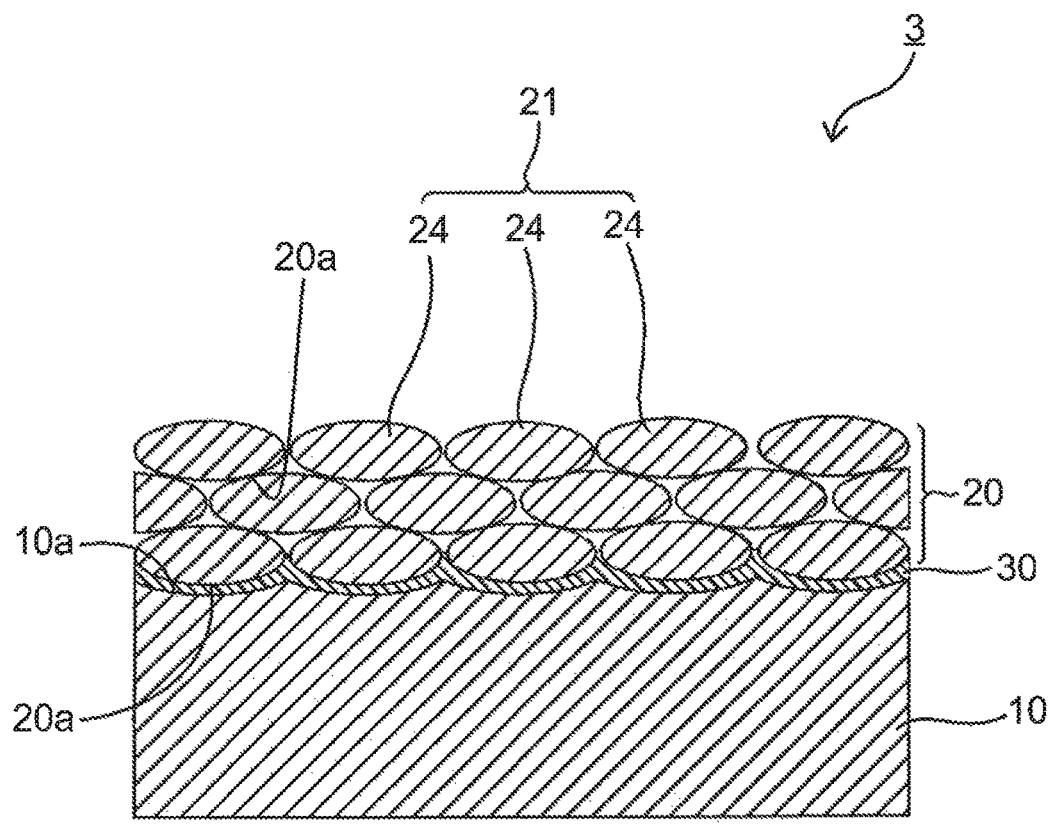
FIG. 5 is a schematic cross-sectional view of a sliding member according to a third embodiment of the present invention.

FIG. 5 is a cross-sectional view of the sliding member according to the third embodiment of the present invention. As illustrated in FIG. 5, the sliding member 3 of the embodiment is different from the sliding member of the second embodiment in that it further includes a predetermined intermediate layer 30 over the entire interface between the base 10 and the coating layer 20. The predetermined intermediate layer 30 includes a diffusion layer or an intermetallic compound layer or includes a diffusion layer and an intermetallic compound layer. When the intermediate layer includes a diffusion layer, the intermediate layer may consist of the diffusion layer. When the intermediate layer includes an intermetallic compound layer, the intermediate layer may consist of the intermetallic compound layer.

As described above, the sliding member of the embodiment includes the base, the coating layer formed on the base and the intermediate layer that is formed in at least a part of the interface between the base and the coating layer and includes at least one of a diffusion layer and an intermetallic compound layer, in which the coating layer includes the particle aggregate containing the first particles of a precipitation-hardening copper alloy. With this configuration, the sliding member exhibits even higher abrasion resistance at high temperature. Further, it is also advantageous that the first particles of a precipitation-hardening copper alloy can secure the high heat conduction property. In the present invention, it is not always necessary that at least one of the base and the coating layer includes a plastically deformed portion. However, even higher abrasion resistance at high temperature can be achieved when at least one of the base and the coating layer of the sliding member includes a plastically deformed portion. Further, even higher abrasion resistance at high temperature can be achieved when the intermediate layer including at least one of a diffusion layer and an intermetallic compound layer is formed over the entire interface between the base and the coating layer of the sliding member.

It is currently assumed that the above-described advantageous effects are obtained based on the following grounds.

For example, when the first powder of a precipitation-hardening copper alloy is sprayed onto the base to collide with the base, the kinetic energy of the first powder is partly converted to thermal energy. It is assumed that this causes mutual diffusion of elemental components between the base and at least one of the first powder and the first particles so as to form the intermediate layer including at least one of a diffusion layer and an intermetallic compound layer between the base and the coating layer, which is described in detail later.

However, even when the above-described advantageous effects are obtained based on the other grounds, it should be understood well that the present invention encompasses such sliding members and the like.

The intermediate layer 30 will be described in more detail. The intermediate layer includes a diffusion layer or an intermetallic compound layer or includes a diffusion layer and an intermetallic compound layer. Suitable examples of the diffusion layer include layers that have a gradient structure of the composition. However, the diffusion layer is not limited to those with a gradient structure of the composition. Suitable examples of the intermediate layer with an intermetallic compound layer include layers that have a structure of the intermetallic compound layer being intervened between diffusion layers with a gradient structure of the composition. However, the intermediate layer is not limited thereto. For example, the intermediate layer is composed of an elemental component of the base and an elemental component of the first particles. Specifically, when the base is made of an aluminum alloy, the intermediate layer to be formed is made of an alloy that contains aluminum and copper. However, the intermediate layer is not limited thereto. For example, when the base is made of stainless steel (SUS), the intermediate layer to he formed is made of an alloy that contains an elemental component of the stainless steel (SUS) and copper.

Fourth Embodiment

Next, a sliding member according to a fourth embodiment of the present invention will be described in detail referring to the drawings. The same reference signs are denoted to the same components as those of the above-described embodiments, and the description thereof is omitted.

Figure 6:
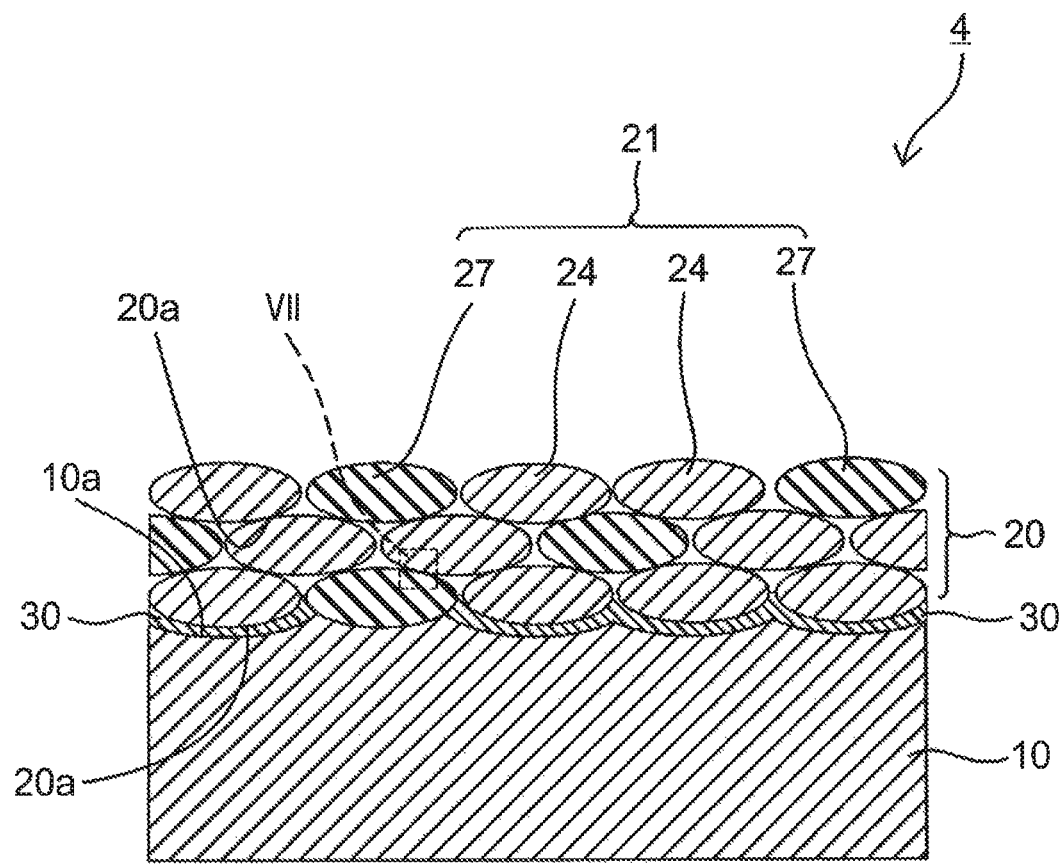
FIG. 6 is a schematic cross-sectional view of a sliding member according to a fourth embodiment of the present invention.
Figure 7:
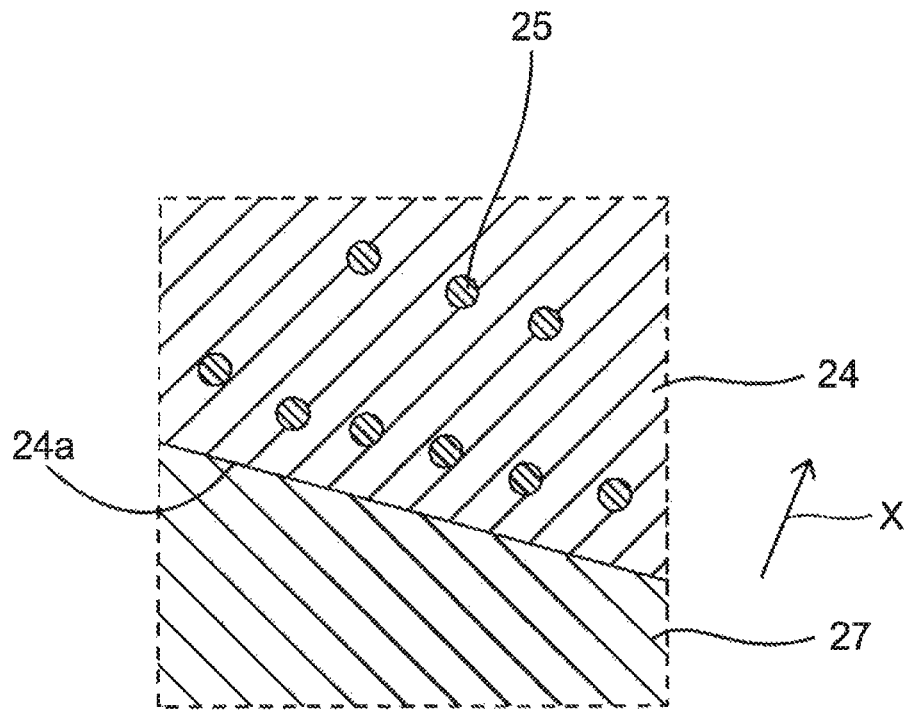
FIG. 7 is an enlargement of the part surrounded by the line VII of the sliding member in FIG. 6.

FIG. 6 is a schematic cross-sectional view of the sliding member according to the fourth embodiment of the present invention. FIG. 7 is an enlargement of the part surrounded by the line VII of the sliding member in FIG. 6. As illustrated in FIG. 6 and FIG. 7, the sliding member 4 of the embodiment is different from the sliding member of the third embodiment in that a particle aggregate 21 includes second particles 27 that are composed of alloy particles such as iron-based alloy particles, cobalt-based alloy particles, chromium-based alloy particles, nickel-based alloy particles or molybdenum-based alloy particles or of ceramic particles. It should be understood well that the precipitation phase 25 is not included inside the second particles 27.

As described above, the sliding member of the embodiment includes the base and the coating layer formed on the base, in which the coating layer includes particle aggregate containing the first particles of a precipitation-hardening copper alloy, and the particle aggregate further contains the second particles that are composed of alloy particles such as iron-based alloy particles, cobalt-based alloy particles, chromium-based alloy particles, nickel-based alloy particles or molybdenum-based alloy particles or of ceramic particles. With this configuration, the sliding member of the embodiment exhibits even higher abrasion resistance at high temperature. Further, it is also advantageous that the first particles of a precipitation-hardening copper alloy can secure the high heat conduction property. In the present invention, it is not always necessary that at least one of the base and the coating layer includes a plastically deformed portion. However, even higher abrasion resistance at high temperature can be achieved when at least one of the base and the coating layer of the sliding member includes a plastically deformed portion. Further, when the particle aggregate of the sliding member includes at least one predetermined precipitation phase in the surface of the first particles, even higher abrasion resistance at high temperature can be achieved. Further, when the intermediate layer is formed in at least a part of the interface between the base and the coating layer of the sliding member, even higher abrasion resistance at high temperature can be achieved.

It is currently assumed that the above-described advantageous effects are obtained based on the following grounds.

For example, when the base has an oxide coating in the surface that inhibits adhesion between the base and the coating layer, it is assumed that spraying the first powder of a precipitation-hardening copper alloy and the second powder onto the base and resultant collision of the second powder with the base removes the oxide coating to expose and form a new interface of the base that exhibits good adhesion with the coating layer, which is described in detail later. This phenomenon is particularly likely to occur when the particles of the second powder are harder than the particles of the first powder.

For another example, when the second powder collides with the base, the second powder bites into the base. It is assumed that this anchor effect, in other words the plastically deformed portion of the base composed of flat recesses, improves the adhesion between the base and the coating layer. This phenomenon is particularly likely to occur when the particles of the second powder are harder than the particles of the first powder.

When the particles of the second powder are harder than the particles of the first powder, the precipitation phase 25 is likely to be precipitated in the vicinity of the surface 24a of the first particles 24 in the border between the first particles and the second particles (see FIG. 7, the vicinity of the surface of the first particles refers to, for example, the area from the surface 24a to a depth of approximately 1 μas illustrated by the arrow X). However, the precipitation phase 25 is not limited thereto. This is presumably because when the first powder collides with the second particles, the kinetic energy of the first powder is partly converted to thermal energy and the first powder is partly formed into a plastically deformed portion. The heat generated in this process promotes precipitation hardening of the precipitation-hardening copper alloy of a part of the first particles.

However, even when the above-described advantageous effects are obtained based on the other grounds, it should be understood well that the present invention encompasses such sliding members and the like.

The second particles 27 will be described in more detail. The second particles are not particularly limited. However, it is preferred that the second particles are harder than the base. Further, it is preferred that the second particles are harder than the precipitation-hardening copper alloy. Examples of particles that are preferably used as the second particles include alloy particles such as iron-based alloy particles, cobalt-based alloy particles, chromium-based alloy particles, nickel-based alloy particles and molybdenum-based alloy particles and ceramic particles. These particles may be used alone or in combination of two or more types.

Examples of such iron-based alloys include SUS 440C according to the Japanese Industrial Standard and the like. Examples of such cobalt-based alloys include TRIBALOY (registered trademark) T-400, T-800 and the like. Examples of such chromium-based alloys include ferrochromium and the like. Examples of such nickel-based alloys include TRIBALOY (registered trademark) T-700 and the like. Examples of such molybdenum-based alloys include ferromolybdenum and the like. Examples of such ceramics include WC/Co, $Al_2O_3$ and the like. Among them, it is preferred to use a cobalt-based alloy since it has high abrasion resistance at high temperature. Specifically, it is preferred to use TRIBALOY (registered trademark) T-400, T-800 or the like.

The percentage of the second particles in a cross section of the coating layer is not particularly limited but ranges preferably from 1 area % to 50 area %, more preferably from 1 area % to 25 area %, still more preferably from 1 area % to 18 area %, particularly preferably from 5 area % to 18 area % in terms of improving the abrasion resistance at high temperature and the heat conduction property. However, it should be understood well that the percentage is not limited to these ranges at all and may be out of these ranges as long as the advantageous effects of the present invention are obtained. Further, it should be understood well that area % calculated by observation of a cross section can be regarded as volume %, and volume % can be converted to weight % using the density of the respective particles.

As described above, the percentage of the second particles in a cross section of the coating layer ranges preferably from 1 area % to 50 area % in terms of improving the abrasion resistance at high temperature and the heat conduction property. However, for an application that does not essentially require high heat conduction property but only requires high abrasion resistance, the percentage of the second particles in a cross section of the coating layer may range from 50 area % to 99 area %. Further the coating layer may include third particles in addition to the first particles and the second particles.

Fifth Embodiment

Next, a sliding member of an internal combustion engine according to a fifth embodiment of the present invention will be described referring to the drawings. The same reference signs are denoted to the same components as those of the above-described embodiments, and the description thereof is omitted.

Figure 8:
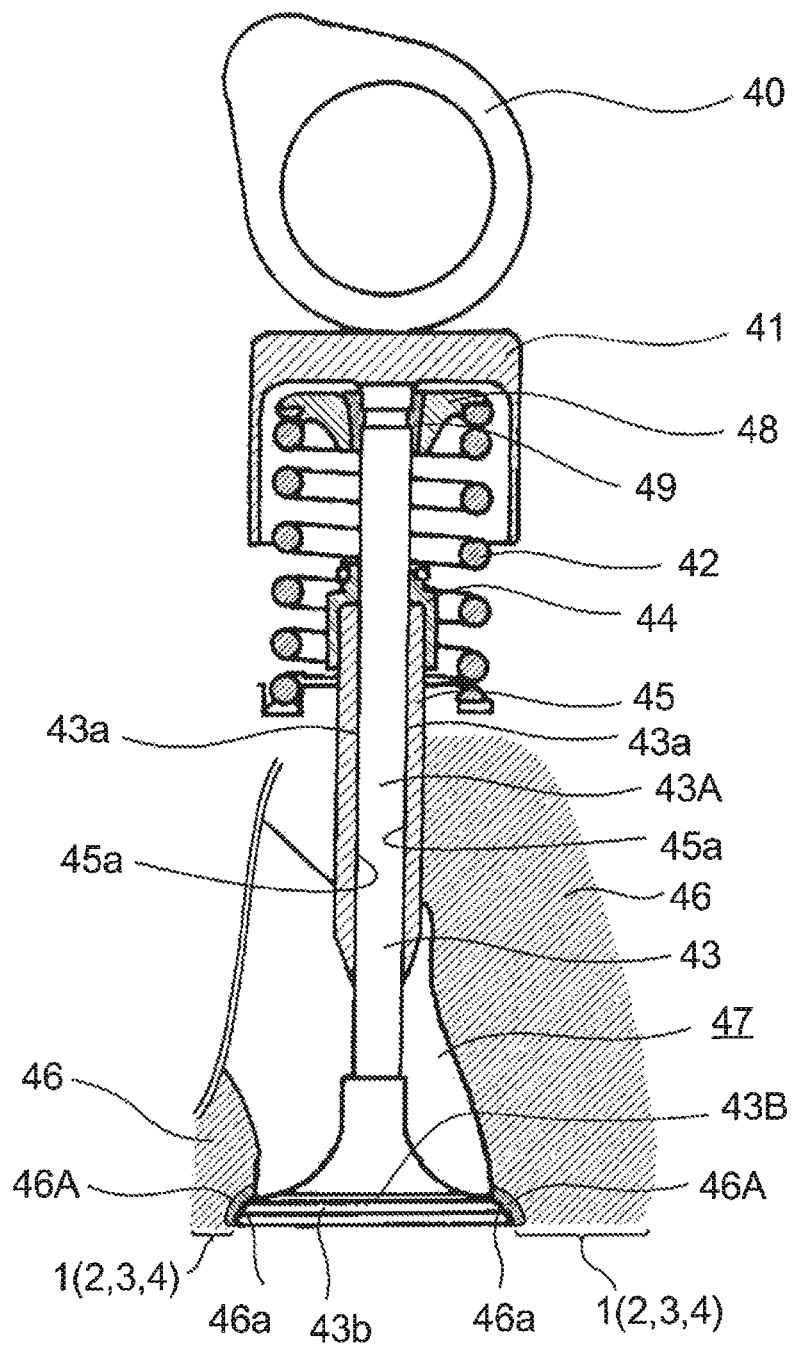
FIG. 8 is a schematic cross-sectional view of a sliding member of an internal combustion engine that includes the sliding member in a sliding portion.

FIG. 8 is a schematic cross-sectional view of the sliding member of the internal combustion engine that includes the sliding member in a sliding portion thereof. To be more specific, FIG. 8 is a schematic cross-sectional view of a valve actuating mechanism including an engine valve. As illustrated in FIG. 8, when a cam lobe 40 is rotated, it pushes down a valve lifter 41 while shrinking a valve spring 42. Simultaneously, it pushes down an engine valve 43 while a valve guide 45 having a stem seal 44 guides the engine valve 43. As a result, the engine valve 43 becomes separated from a seating portion 46A for the engine valve 43 of a cylinder head 46 so that an exhaust port 47 becomes communicated with a combustion chamber (not shown) (the engine valve is open). Thereafter, when the cam lobe 40 is further rotated, a repulsion force of the valve spring 42 pushes up the engine valve 43 along with the valve lifter 41, a retainer 48 and a cotter 49. As a result, the engine valve 43 comes in contact with the seating portion 46A so that the exhaust port 47 is shut off from the combustion chamber (not shown) (the engine valve is closed). In this way, the engine valve 43 opens and closes in synchronization with the rotation of the cam lobe 40. The valve stem 43A of the engine valve 43 is inserted through the valve guide 45 that is press-fitted in the cylinder head 46, in which the valve stem 43A is lubricated with oil. A valve face 43B of the engine valve 43, which serves as an on-off valve of the combustion chamber (not shown), is in or out of contact with the seating portion 46A for the engine valve 43 of the cylinder head 46 during operation. While FIG. 8 illustrates exhaust port 47, the sliding member of the present invention is also applicable to an intake port (not shown).

The above-described sliding member with the coating layer, e.g. the above described sliding members (1, 2, 3, 4) according to the first to fourth embodiments, is applied to a sliding surface 46a of the seating portion 46A for the engine valve of the cylinder head, which is a sliding portion between the cylinder head and the engine valve. This imparts high abrasion resistance at high temperature. Further, it is also advantageous that the first particles of a precipitation-hardening copper alloy can secure high heat conduction property. Furthermore, the application of the sliding member of the present invention onto a cylinder head as the base enables flexibly designing the shape of exhaust ports and intake ports and expanding the diameter of engine valves, which can improve the fuel consumption, the power output, the torque and the like of engines.

Although not shown in the drawings, the above-described sliding member with the coating layer, e.g. the sliding members according to the first to fourth embodiment, is also applicable to, for example, one or both of the sliding surfaces of a valve stem and a counterpart valve guide, and/or at least one portion selected from the group consisting of the sliding surface of a valve stem end, the sliding surface of a valve face and the sliding surface of a press-fitted valve seat. This can impart high abrasion resistance at high temperature. Further, it is also advantageous that the first particles of a precipitation-hardening copper alloy can secure high heat conduction property.

That is, it is preferred that the cylinder head of the embodiment includes the sliding member of the above-described embodiments in the seating portion of an engine valve. Further, another example of the cylinder head of the embodiment includes a valve seat with the sliding member of the above-described embodiments, and it is preferred that the sliding member is included in the seating portion for an engine valve of the valve seat. Further, it is preferred that the valve seat of the embodiment includes the sliding member of the above-described embodiments in the seating portion for the engine valve. Further, it is preferred that the engine valve of the embodiment includes the sliding member of the above-described embodiments in the valve face. Further, it is preferred that another engine valve of the embodiment includes the sliding member of the above-described embodiments in the sliding portion against the valve guide.

Sixth Embodiment

Next, a sliding member according to a sixth embodiment of the present invention will be described in detail referring to the drawings. The same reference signs are denoted to the same components as those in the above-described embodiments, and the description thereof is omitted.

Figure 9:
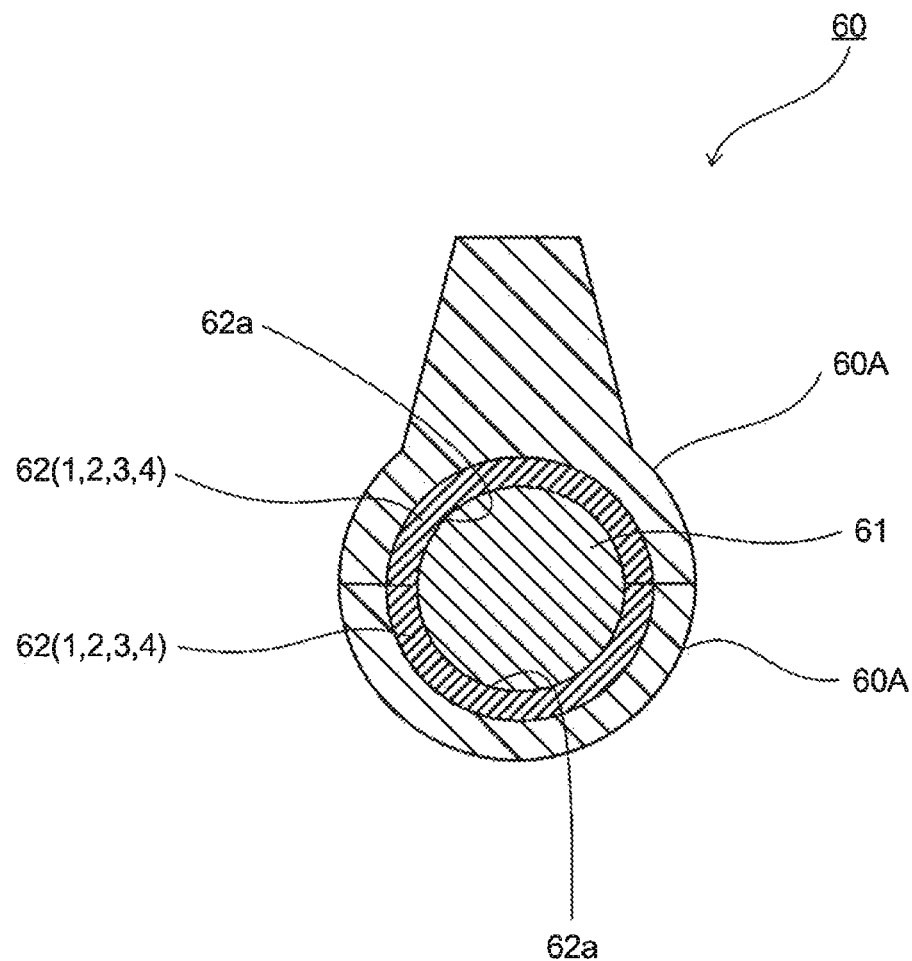
FIG. 9 is a schematic cross-sectional view of a bearing mechanism of an internal combustion engine that includes a sliding member in a bearing metal of the bearing mechanism.

FIG. 9 is a schematic cross-sectional view of a bearing mechanism of an internal combustion engine that includes the sliding member in a bearing metal of the bearing mechanism thereof. To be more specific, FIG. 9 is a schematic cross-sectional view of the bearing metal that serves as a sliding member of a connecting rod. As illustrated in FIG. 9, a big end 60A of the connecting rod 60, which is located at a crank (not shown), is divided into upper and lower two parts. Accordingly, two divided bearing metals 62 for supporting a crank pin 61 are disposed in the big end 60A.

The above-described sliding member with the coating layer, e.g. the sliding members (1, 2, 3, 4) according to the above-described first to fourth embodiments, is applied to the sliding surfaces 62a of the bearing metals 62. This imparts high abrasion resistance at high temperature. Further, it is also advantageous that the first particles of a precipitation-hardening copper alloy can secure high heat conduction property.

Although not shown in the drawings, the above-described sliding member with the coating layer, e.g. the sliding members according to the above-described first to fourth embodiments, is also applicable to the sliding surface of two divided bearing metals for supporting a piston pin of the connecting rod, which is located at a small end on a piston side (not shown). This imparts good abrasion resistance at high temperature. Further, it is also advantageous that the first particles of a precipitation-hardening copper alloy can secure high heat conduction property.

That is, it is preferred that the bearing mechanism of the internal combustion engine of the embodiment includes the sliding member of the above-described embodiments in a bearing metal of the bearing mechanism of the internal combustion engine.

Seventh Embodiment

Next, a method for manufacturing a sliding member according to a seventh embodiment of the present invention will be described. The method for manufacturing the sliding member of the embodiment is to produce the sliding member of the present invention, e.g. the sliding members according to the above-described first to fourth embodiments. The method for manufacturing the sliding member includes a step of spraying a first powder of a precipitation-hardening copper alloy or a mixed powder containing the first powder and a second powder harder than the first powder onto a base in an unmelted state so as to form a coating layer on the base, in which the coating layer includes a particle aggregate that contains first particles of the precipitation-hardening copper alloy or a particle aggregate that contains first particles and second particles harder than the first particles.

As described above, the coating layer, which includes the particle aggregate containing the first particles of the precipitation-hardening copper alloy or the particle aggregate containing the first particles and the second particles, is formed on the base by spraying the first powder of the precipitation-hardening copper alloy or the mixed powder containing the first powder and the second powder harder than the first powder, preferably the first powder or the first powder and the second powder, onto the base in an unmelted state without causing precipitation of additive elements at a such speed that forms a plastically deformed portion in at least one of the base and the coating layer. In other words, the coating layer is formed by a method known as kinetic spraying, cold spraying or warm spraying. This can efficiently form the coating layer with good abrasion resistance at high temperature. However, the sliding member of the present invention is not limited to those produced by this method.

A more specific manufacturing method will be described in more detail.

Of the above-described materials, the first powder is not particularly limited and may be any powder that is in an unmelted state and is made of a precipitation-hardening copper alloy. For example, the first powder is preferably in the state of supersaturated solid solution. Since the first powder exhibits high ductibility, in other words high deformability, in the state of supersaturated solid solution, it is possible to efficiently faun the coating layer and to improve the film formability. The powder in the state of supersaturated solid solution is not particularly limited. For example, it is preferred to use powder obtained by rapid solidification such as atomizing. When the first powder collides with base and the like, a fine hard phase (precipitation phase) is formed by the pressure caused by the collision and the frictional heat generated by the difference of deformation speed between the first powder and the base and the like in flattening of the first particles. As a result, the strength of the coating layer is increased.

With regard to the materials, the second powder that contains an alloy powder such as an iron-based alloy powder, a cobalt-based alloy powder, a chromium-based alloy powder, a nickel-based alloy powder or a molybdenum-based alloy powder or a ceramic powder may be further added to the first powder. One second powder or a suitable mixture of two or more second powders may be used.

The average particle size of the first powder and the second powder of the materials is not particularly limited but, for example, ranges preferably from 5 μm to 40 μm, more preferably from 20 μm to 40 μm. When the average particle size is less than 5 μm, the low fluidity may cause insufficient supply of the powder. When the average particle size is greater than 50 μm, the insufficient particle speed in film forming may result in imperfect film forming. For example, the "average particle size" may mean number average particle size (d50) that is measured and calculated with an image analytical particle size distribution measuring instrument. Further, the "particle size" for measuring and calculating the average particle size may be, for example, the maximum distance between arbitral two points on the contour of observed powder (in an observation plane). However, the "particle size" is not limited thereto and may be, for example, the diameter of an equivalent circle of observed powder (in an observation plane). Alternatively, the "average particle size" may mean number average particle size (d50) that is measured and calculated with laser diffraction scattering particle size distribution measuring instrument. However, it should be understood well that the particle size is not limited to these ranges at all and may be out of these ranges as long as the advantageous effects of the present invention can be obtained.

The powder is sprayed preferably at a such high speed that makes the first powder be sprayed onto the base to form a plastically deformed portion in at least one of the base and the coating layer. However, the speed is not particularly limited. For example, the powder speed preferably ranges from 300 m/s to 1200 m/s, more preferably from 500 m/s to 1000 m/s, still more preferably from 600 m/s to 800 m/s. The pressure of operating gas supplied for spraying the powder preferably ranges from 2 MPa to 5 MPa, more preferably from 3.5 MPa to 5 MPa. When the pressure of the operating gas is less than 2 MPa, a sufficient powder speed is not achieved, which may result in the large porosity. However, it should be understood well that the speed and the pressure are not limited to these ranges and may be out of these ranges as long as the advantageous effects of the present invention can be obtained.

The temperature of the operating gas is not particularly limited but, for example, ranges preferably from 400° C. to 800° C., more preferably from 600° C. to 800° C. When the temperature of the operating gas is less than 400° C., the abrasion resistance may be decreased due to the large porosity. When the temperature of the operating gas is greater than 800° C., the nozzle may be clogged. However, it should be understood well that the temperature is not limited to these ranges and may be out of these ranges as long as the advantageous effects of the present invention can be obtained.

The type of the operating gas is not particularly limited. However, examples of operating gas include nitrogen, helium and the like. They may be used alone or in combination of two or more. Further, a mixture of fuel gas and nitrogen may also be used.

After the coating layer is formed, the sliding member may be aged or tempered at 250° C. to 500° C. for 0.5 hour to 4 hours. This can improve the abrasion resistance at high temperature and the heat conduction property. This aging or tempering may be also done, for example, by utilizing heat from a combustion chamber in a test run in an inspection that is conducted after the engine is assembled.

EXAMPLES

Hereinafter, the present invention will be described in more detail with examples. However, the present invention is not limited to these examples.

Example 1

Only a copper-nickel-silicon alloy powder (composition: Cu-2.9Ni-0.7Si, atomized powder) was prepared as the material.

A preprocessed aluminum base is prepared by preprocessing an aluminum base (Japanese Industrial Standard H 4040 A5056) according to a condition that the target thickness of a coating layer is 0.2 mm in a seating portion for an engine valve of a cylinder head in a finished condition.

Then, the aluminum base was mounted on a rotary table, and the alloy powder was sprayed onto the aluminum base with a high-pressure cold sprayer (PCS-1000, Plasma Giken Co., Ltd., operating gas: nitrogen, temperature of 600° C., particle speed of 680 m/s to 720 m/s, pressure of 4 MPa) while rotating the rotary table, so as to form a coating layer with a thickness of 0.4 mm to 0.5 mm on the base.

Thereafter, the coating layer was finished by machining into the actual shape of the seating portion for the engine valve of the cylinder head. The sliding member of the example was thus obtained. The thickness of the coating layer was 0.2 mm.

Example 2

The same procedure as that in Example 1 was repeated except that a copper-nickel-silicon-vanadium-chromium alloy powder (composition: Cu-14Ni-3Si-2V-2.2Cr-1.4Fe-1.2Al, atomized powder) was used instead of the copper-nickel-silicon alloy powder (composition: Cu-2.9Ni-0.7Si, atomized powder), so that the sliding member of the example was obtained.

Example 3

The same procedure as that in Example 1 was repeated except that a mixed powder containing the copper-nickel-silicon alloy powder (composition: Cu-2.9Ni-0.7Si, atomized powder) and a cobalt-based alloy powder (TRIBALOY (registered trademark) T-400, Kennametal Stellite Inc.) in the ratio (mass ratio) of Cu-2.9Ni-0.7Si:TRIBALOY =95:5 was used instead of the copper-nickel-silicon alloy powder (composition: Cu-2.9Ni-0.7Si, atomized powder), so that the sliding member of the example was obtained.

Example 4

The same procedure as that in Example 1 was repeated except that a mixed powder containing the copper-nickel-silicon alloy powder (composition: Cu-2.9Ni-0.7Si, atomized powder) and a cobalt-based alloy powder (TRIRALOY (registered trademark) T-400, Kennametal Stellite Inc.) in the ratio (mass ratio) of Cu-2,9Ni-0.7Si:TRIBALOY =85:15 was used instead of the copper-nickel-silicon alloy powder (composition: Cu-2.9Ni-0.7Si, atomized powder), so that the sliding member of the example was obtained.

Comparison 1

The same procedure as that in Example 1 was repeated except that a stainless-steel powder (Japanese industrial Standard SUS316L) was used instead of the copper-nickelsilicon alloy powder (composition: Cu-2.9Ni-0.7Si, atomized powder), so that the sliding member of the comparison was obtained.

Comparison 2

The same procedure as that in Example 1 was repeated except that a copper-iron-manganese alloy powder (composition: Cu-4Fe-4Mn) was used instead of the copper-nickel-silicon alloy powder (composition: Cu-2.9Ni-0.7Si, atomized powder), so that the sliding member of the comparison was obtained.

Comparison 3

The same procedure as that in Example 1 was repeated except that a copper-nickel alloy powder (composition: Cu-30Ni) was used instead of the copper-nickel-silicon alloy powder (composition: Cu-2.9Ni-0.7Si, atomized powder), so that the sliding member of the comparison was obtained.

Comparison 4

The same procedure as that in Example 1 was repeated except that a copper-tin alloy powder (composition: Cu-30Sn) was used instead of the copper-nickel-silicon alloy powder (composition: Cu-2.9Ni-0.7Si, atomized powder). However, it was difficult to form the coating layer. The specification of the samples was partly shown in Table 1. The ratio of the first particles and the second particles and the porosity in a cross section of the coating layer of the samples were calculated by multiple times of observation of a scanning electron microscopic (SEM) image of a cross section of the coating layer and image processing to the scanning electron microscopic (SEM) cross-sectional image such as binarization. The precipitation phase of the first particles of the samples was specified by observation of a transmission electron microscopic (TEM) image of a cross section of the coating layer and energy dispersive X-ray (EDX) analysis. The presence or absence of an intermediate layer and the presence or absence of a plastically deformed portion in a cross section of the sliding members of the samples were determined by observation of a scanning electron microscopic (SEM) image of a cross section of the coating layer and energy dispersive X-ray (EDX) analysis. In all of Example 1 to Example 4 and Comparison 1 to Comparison 3, plastically deformed portions were observed in the base and the coating layer.

TABLE 1

| | Material | | Coating Layer (Particle Aggregate) First Particles | | |
|---|---|---|---|---|---|
| | First Powder | Second Powder | Type | Percentage (area %) | Precipitation Phase |
| Example 1 | Cu—2.9Ni—0.7Si | — | Cu—2.9Ni—0.7Si | 99.9 | Ni$_2$Si |
| Example 2 | Cu—14Ni—3Si—2V—2.2Cr—1.4Fe—1.2Al | — | Cu—14Ni—3Si—2V—2.2Cr—1.4Fe—1.2Al | 99.5 | Ni$_2$Si |
| Example 3 | Cu—2.9Ni—0.7Si | TRIBALOY T-400 | Cu—2.9Ni—0.7Si | 94 | Ni$_2$Si |
| Example 4 | Cu—2.9Ni—0.7Si | TRIBALOY T-400 | Cu—2.9Ni—0.7Si | 84.8 | Ni$_2$Si |
| Comparison 1 | SUS316L | — | SUS316L | 97.8 | — |
| Comparison 2 | Cu—4Fe—4Mn | — | Cu—4Fe—4Mn | 98.6 | — |
| Comparison 3 | Cu—30Ni | — | Cu—30Ni | 98.3 | — |
| Comparison 4 | Cu—30Sn | — | Difficult to form coating layer | | |

| | Coating Layer (Particle Aggregate) Second Particles | | | |
|---|---|---|---|---|
| | Type | Percentage (area %) | Porosity (area %) | Intermediate Layer |
| Example 1 | — | — | 0.1 | Yes |
| Example 2 | — | — | 0.5 | Yes |
| Example 3 | TRIBALOY T-400 | 5 | 1 | Yes |
| Example 4 | TRIBALOY T-400 | 15 | 0.2 | Yes |
| Comparison 1 | — | — | 2.2 | Yes |
| Comparison 2 | — | — | 1.4 | Yes |
| Comparison 3 | — | — | 1.7 | Yes |
| Comparison 4 | Difficult to form coating layer | | | |

Evaluation of Performance

The following performances were evaluated for the above-described sliding members of the samples.

Abrasion Resistance at High Temperature

Figure 10:
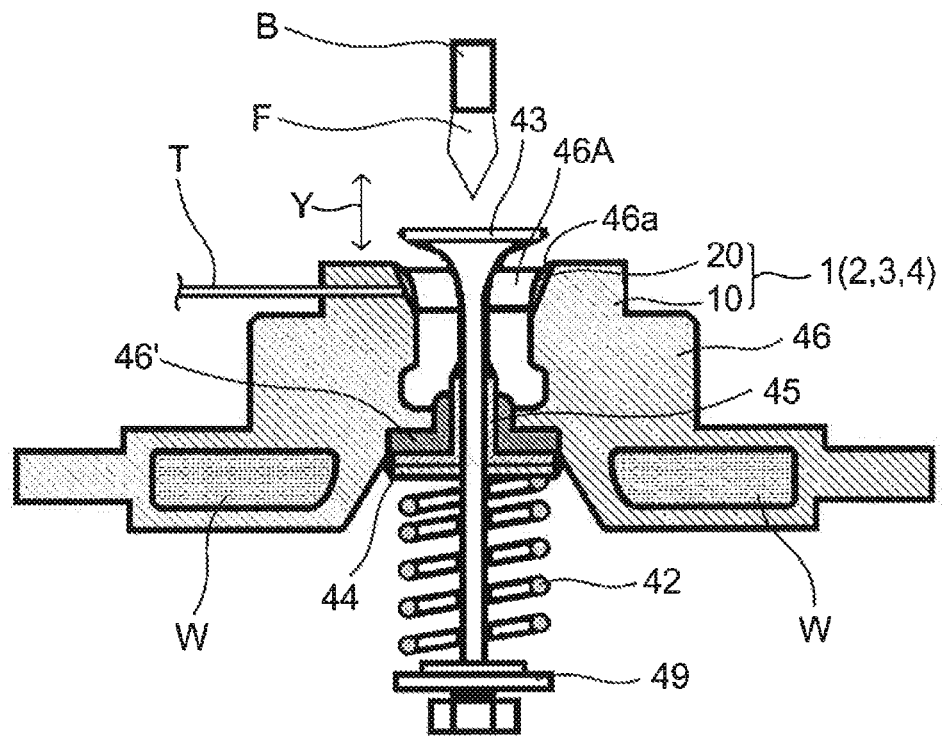
FIG. 10 is a cross-sectional view illustrating the overview of an abrasion tester.

FIG. 10 is a cross-sectional view illustrating the outline of an abrasion tester. As illustrated in FIG. 10 the abrasion tester resembling a valve actuating mechanism of an engine is fabricated from actual engine parts such as a valve spring 42, an engine valve 43, a stem seal 44, a valve guide 45, a cylinder head 46, 46' and a cotter 49. The sliding members (1, 2, 3, 4) of the samples were applied as a seating portion 46A for the engine valve 43 of the cylinder head 46. The sliding members (1, 2, 3, 4) include the respective predetermined coating layers 20 on the bases 10. The engine valve 43 is open in the figure. The engine valve 43 reciprocates in the vertical direction as illustrated by the arrow Y in the figure by means of an eccentric cam (not shown) so that the engine valve 43 repeatedly opens and closes. The sliding surface 46a of the seating portion 46A for the engine valve 43 of the cylinder head 46 is in a high-temperature environment by means of a flame F of a gas burner B. The temperature of the seating portion 46A is measured with a thermometer T. Cooling water W is circulated in the cylinder head 46.

The amount of abrasion was measured and calculated with the above-described abrasion tester in the following test conditions. Specifically, the shape of the seating portion for the engine valve of the cylinder head was determined with a shape measuring instrument before and after the test. The amount of abrasion was measured at four points, and the average thereof was calculated. The results are shown in Table 2.

Test Conditions

Temperature: 300° C. (A seating portion for an engine valve of a cylinder head in an exhaust port was simulated.)

Number of inputs: 540000 times

Heat Conduction Property

The heat conduction property of the above-described sliding members of the samples was evaluated by measuring and calculating the heat conductivity of the sliding members of the samples by a laser flash method. The results are shown in Table 2. (However, Comparison 2 and Comparison 3 were not measured.)

Film Formability

The powder of the samples was sprayed onto a flat-plate aluminum base for a certain period of time in the same forming conditions as the coating layers of the samples. The amount of powder supplied and the amount of powder unattached were measured, and the adhesion ratio was calculated therefrom. The film formability was thus evaluated. The results are shown in Table 2.

TABLE 2

| | Amount of Abrasion (μm) | Heat Conductivity (W/m · K) | Adhesion Ratio (%) |
|---|---|---|---|
| Example 1 | 41.8 | 64 | 99 |
| Example 2 | 42.3 | 15 | 71 |
| Example 3 | 20.6 | 60 | 74 |
| Example 4 | 20.4 | 51 | 58 |
| Comparison 1 | 63.6 | 5 | 72 |
| Comparison 2 | 59.2 | — | 98 |
| Comparison 3 | 51.8 | — | 94 |
| Comparison 4 | — | — | — |

As seen from Table 1 and Table 2, inventive Example 1 to Example 4 exhibited a 20% to 70% less amount of abrasion than non-inventive Comparison 1 to Comparison 3 and had such good abrasion resistance at high temperature.

This is presumably because the coating layer of the particle aggregate containing the first particles of the precipitation-hardening copper alloy was formed on the base by spraying the first powder of the precipitation-hardening copper alloy in the state of atomized powder of supersaturated solid solution in an unmelted state onto the base at a to high speed. Further, this is also presumably because the precipitation-hardening copper alloy contains nickel and silicon as additive elements. Further, this is also presumably because the particle aggregate includes a precipitation phase of nickel silicate ($Ni_2Si$) in the surface of the first particles. Further, this is also presumably because both the base and the coating layer include a plastically deformed portion. Further, this is also presumably because the porosity of the coating layer is equal to or less than 3 area %. Further, this is also presumably because the sliding member includes an intermediate layer in at least a part of the interface between the base and the coating layer.

When a sliding member has a heat conductivity of 30 W/m·K, it is regarded to have high heat conduction property. Accordingly, as seen from Table 1 and Table 2, inventive Example 1, Example 3 and Example 4 have high heat conductivity and can secure high heat conduction property. This is presumably because the first powder is made of a precipitation-hardening copper alloy. Further, this is also presumably because the porosity of the coating layer is equal to or less than 3 area %. Example 2 does not have particularly high heat conductivity. However, it can be said the heat transferring property is high since Example 2 can be formed into a thin film compared with press-fitting sliding members.

As seen from Table 1 and Table 2, inventive Example 1 and Example 2, to which no second powder is added, demonstrate that sliding members with high abrasion resistance at high temperature can be efficiently produced with similar or higher adhesion ratio compared with non-inventive Comparison 1 to Comparison 3. Further, non-inventive Comparison 4 had difficulty in forming a coating layer compared with inventive Example 1 to Example 4 and non-inventive Comparison 1 to Comparison 3.

As seen from Table 1 and Table 2, Example 3 and Example 4, to which the second powder of the cobalt-based alloy powder is added, exhibit a 40% to 70% less amount of abrasion that non-inventive Comparison 1 to Comparison 3 and a further less amount of abrasion than. Example 1, to which no second powder is added. Example 3 and Example 4 have such even higher abrasion resistance at high temperature.

This is presumably because the coating layer of the particle aggregate containing the first particles of the precipitation-hardening copper alloy and the second particles of the cobalt-based alloy powder was formed on the base by spraying the first powder of the precipitation-hardening copper alloy in the state of atomized powder of supersaturated solid solution in an unmelted state and the second powder of the cobalt-based alloy particles in an unmelted state onto the base at a high speed.

As seen from Table 1 and Table 2, Example 4, to which an increased amount of second powder of the cobalt-based alloy powder is added, has high abrasion resistance at high temperature compared with Example 3. Further, Example 4 can secure high heat conduction property although the heat conductivity is slightly lower than Example 3. Currently, Example 3 is considered the most preferred in terms of the high abrasion resistance at high temperature, the high heat conduction property and the productivity at low cost due to the high adhesion ratio. In terms of the abrasion resistance at high temperature, Example 4 is considered the most preferred.

Figure 11:
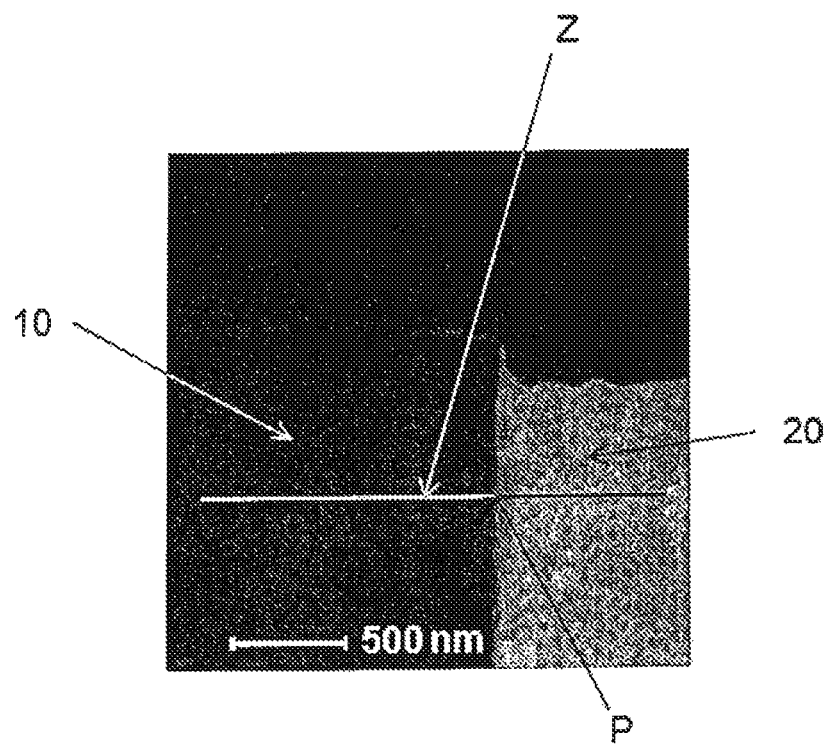
FIG. 11 is a scanning electron microscopic (SEM) cross-sectional image of the sliding member of Example 4.
Figure 12:
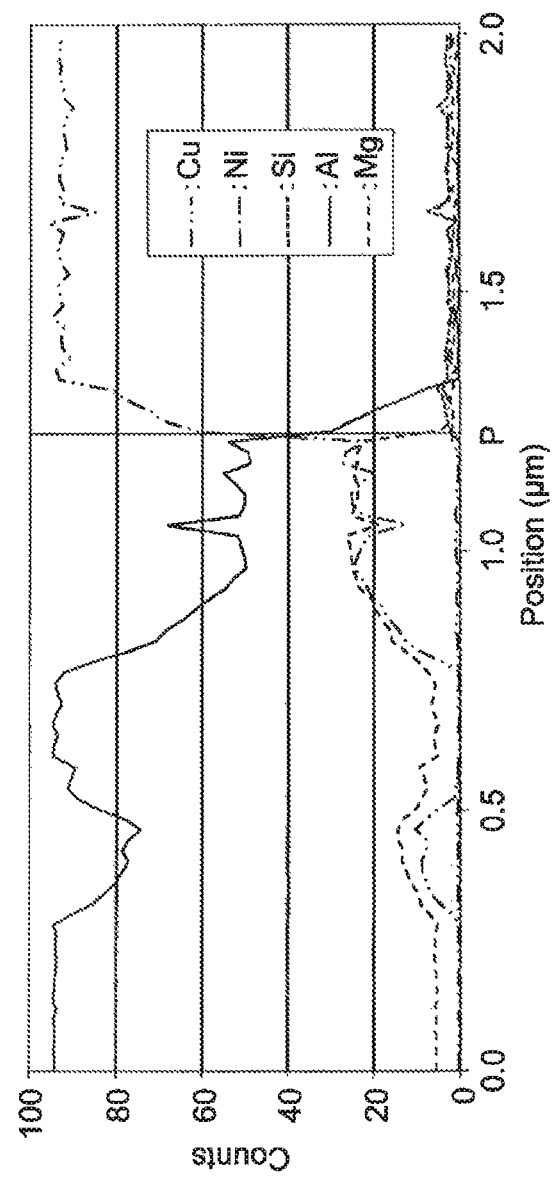
FIG. 12 is a graph illustrating the result of an energy dispersive X-ray (EDX) analysis of the sliding member of Example 4.

FIG. 11 is a scanning electron microscopic (SEM) cross-sectional image around the interface between the base 10 and the coating layer 20 of the sliding member of Example 4. FIG. 12 is a graph illustrating the result of an energy dispersive X-ray (EDX) analysis (linear analysis) of the sliding member of Example 4 along the line Z in FIG. 11. The point P in FIG. 11 and the point P in FIG. 12 indicate the same location. In FIG. 12, the position 0.0 μm corresponds to the end of the line Z in the base 10 in FIG. 11, and the position 2.0 μm corresponds to the end of the line Z in the coating layer 20.

As seen from FIG. 11 and FIG. 12, the sliding member includes the base 10 of an aluminum alloy and the coating layer 20 of a copper alloy formed on the base 10, and an intermediate layer is formed between the base 10 and the coating layer 20. The intermediate layer is formed in the position approximately from 0.75 μm to 1.31 μm.

Further, diffusion layers are formed in the position approximately from 0.75 μm to 0.96 μm and the position approximately from 1.23 μm to 1.31 μm. The diffusion layers have a gradient structure of the composition. In the position approximately from 0.96 μm to 1.23 μm, the ratio (atomic ratio) of aluminum, magnesium and copper is approximately Al:Mg:Cu=2:1:1, showing that an intermetallic compound layer is formed in this position.

As described above, the sliding member has high abrasion resistance at high temperature and high heat conduction property also presumably because it includes the intermediate layer that is located between the base and the coating layer and includes at least one of a diffusion layer and an intermetallic compound layer. Further, the sliding member has high abrasion resistance at high temperature and high heat conduction property also presumably because it includes the intermediate layer that includes a diffusion layer with a gradient structure of the composition. Further, the sliding member has high abrasion resistance at high temperature and high heat conduction property also presumably because it includes the intermediate layer that includes an intermetallic compound layer intervened between diffusion layers with a gradient structure of the composition.

While the present invention is described with some embodiments and examples, the present invention is not limited thereto, and a variety of changes can be made within the scope of the present invention.

For example, the components described in the above-described embodiments and examples are not limited to the individual embodiments and examples. For example, the type, the ratio and the film thrilling conditions of the first powder and the second powder can be changed. Further, the components of an embodiment or an example may be those other than the combinations of the above-described embodiments and examples.

REFERENCE SINGS LIST 1, 2, 3, 4 Sliding member
10 Base
10a Plastically deformed portion
20 Coating layer
20a Plastically deformed portion
21 Particle aggregate
23, 24 first particles
24a Surface
25 Precipitation phase
27 second particles
30 Intermediate layer
40 Cam lobe
41 Valve lifter
42 Valve spring
43 Engine valve
43A Valve stem
43a Sliding surface
43B Valve face
43b Sliding surface
44 Stem seal
45 Valve guide
45a Sliding surface
46, 46' Cylinder head
46A Seating portion
46a Sliding surface
47 Exhaust port
48 Retainer
49 Cotter
60 Connecting rod
60A Big end
61 Crank pin
62 Bearing metal
62a Sliding surface
B Gas burner
F Flame
T Thermometer
W Cooling water

The invention claimed is:

1. A sliding member, comprising:
   a base;
   a coating layer formed on the base; and
   an intermediate layer that is formed in at least a part of an interface between the base and the coating layer and comprises at least an intermetallic compound layer,
   wherein the coating layer includes a particle aggregate containing first particles of a precipitation-hardening copper alloy including a precipitation phase.

2. The sliding member according to claim 1,
   wherein the precipitation-hardening copper alloy contains nickel and silicon as additive elements, and
   the precipitation phase is a precipitation phase of nickel silicate inside at least a part of the first particles.

3. The sliding member according to claim 1, wherein at least one of the base and the coating layer comprises a plastically deformed portion.

4. The sliding member according to claim 1, wherein a porosity in a cross section of the coating layer is equal to or less than 3 area %.

5. The sliding member according to claim 1, wherein the particle aggregate contains second particles of at least one alloy particles selected from the group consisting of iron-based alloy particles, cobalt-based alloy particles, chromium-based alloy particles, nickel-based alloy particles and molybdenum-based alloy particles, and/or second particles of ceramic particles.

6. A sliding member of an internal combustion engine, comprising a sliding member in a sliding portion of the internal combustion engine,
   wherein the sliding member comprises:
      a base;
      a coating layer formed on the base; and
      an intermediate layer that is formed in at least a part of an interface between the base and the coating layer and comprises at least an intermetallic compound layer, and
      the coating layer includes a particle aggregate containing first particles of a precipitation-hardening copper alloy including a precipitation phase.

7. A method for manufacturing a sliding member that comprises:
   a base;
   a coating layer formed on the base; and
   an intermediate layer that is formed in at least a part of an interface between the base and the coating layer and comprises an intermetallic compound layer,
      wherein the coating layer includes a particle aggregate containing first particles of a precipitation-hardening copper alloy including a precipitation phase or a particle aggregate containing the first particles and second particles harder than the first particles, the method comprising the step of:
      spraying a first powder of the precipitation-hardening copper alloy that does not include a precipitation phase or a mixed powder containing the first powder and a second powder harder than the first powder onto the base in an unmelted state, so as to form the coating layer on the base,
      wherein in spraying the first powder or the mixed powder onto the base, the first powder or the mixed powder is sprayed onto the base at such a speed that makes the first powder be sprayed onto the base to form a plastically deformed portion in at least one of the base and the coating layer.

8. The method for manufacturing the sliding member according to claim 7, wherein the first powder is material for spraying and is in a state of supersaturated solid solution.

9. The method for manufacturing the sliding member according to claim 7, wherein the first powder is a material for spraying and is a solidified powder.

* * * * *